United States Patent Office 3,846,177
Patented Nov. 5, 1974

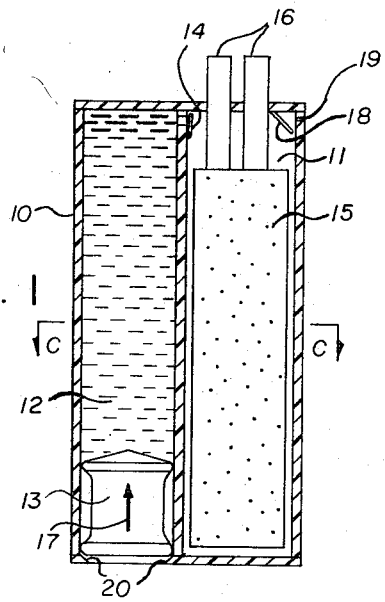
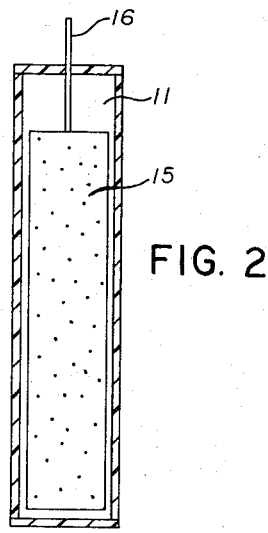
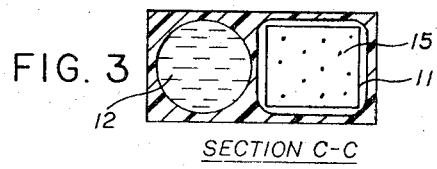
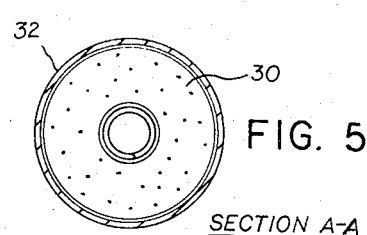
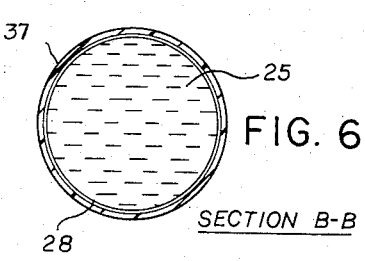
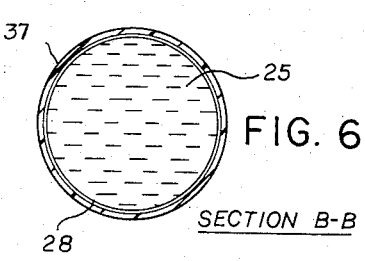

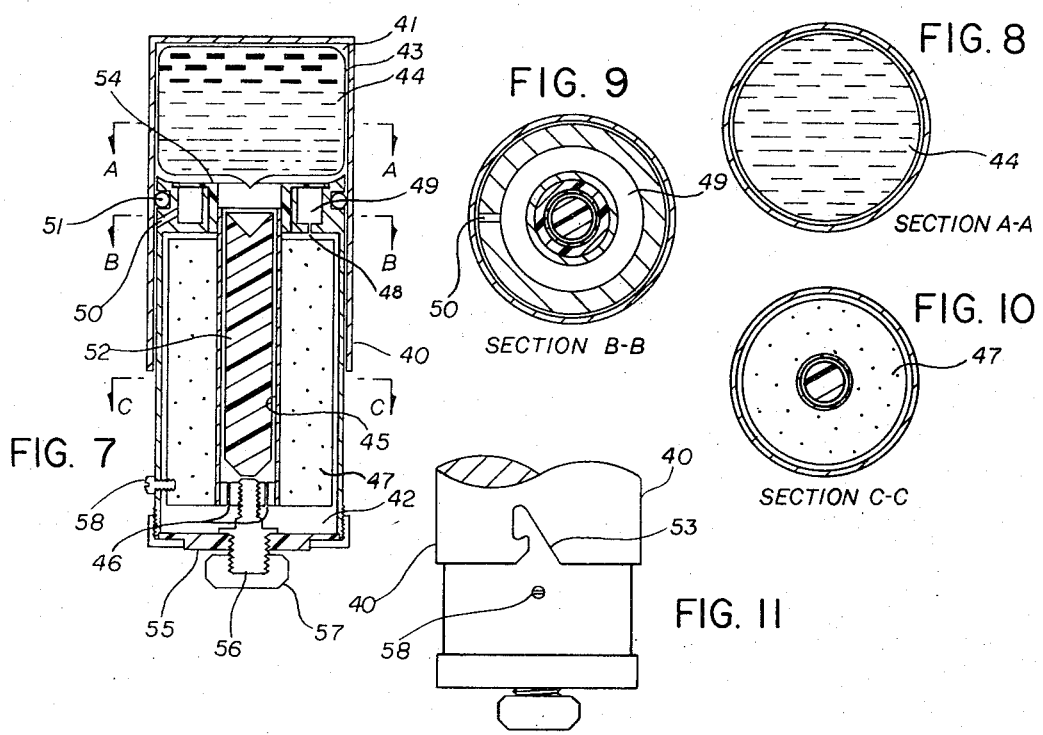
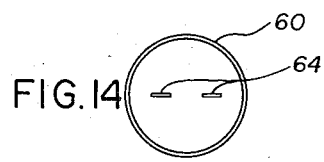
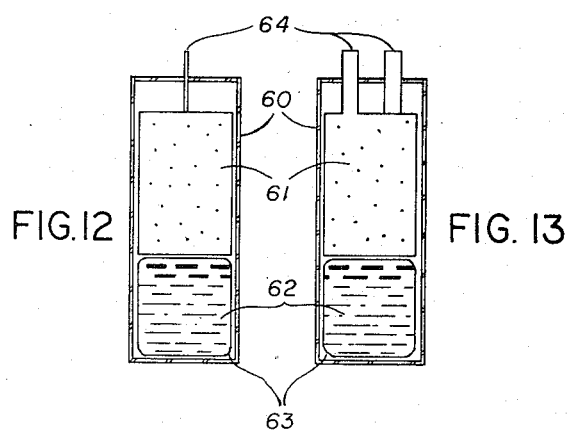

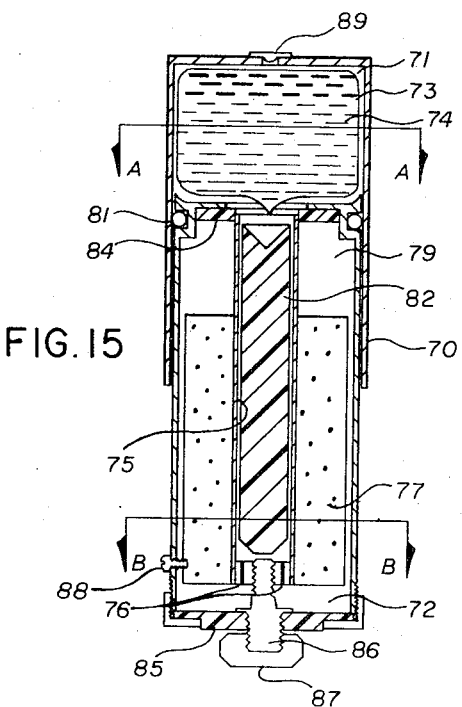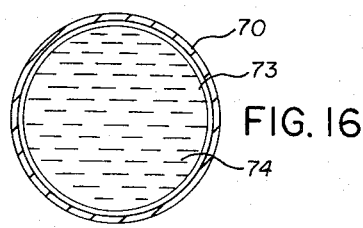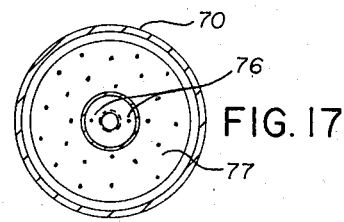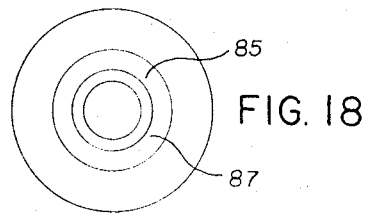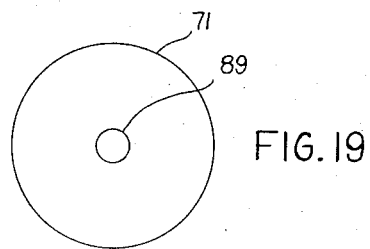

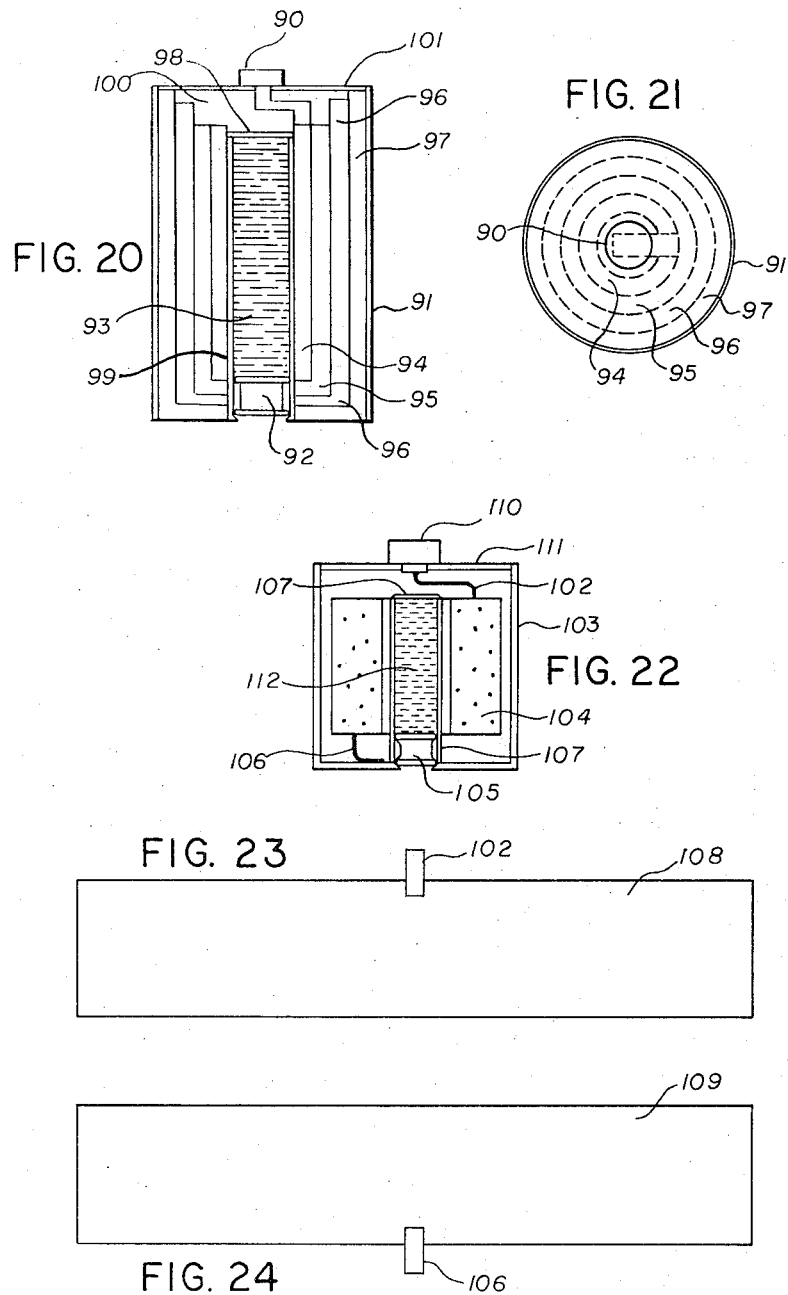

3,846,177
DEFERRED ACTION BATTERIES
Robert E. Mauch and Robert I. Sarbacher, Santa Monica, Calif., assignors to John C. Bogue, Santa Monica, Calif.
Continuation of application Ser. No. 257,643, May 30, 1972. This application Feb. 27, 1974, Ser. No. 446,481
Int. Cl. H01m 21/10
U.S. Cl. 136—114                                15 Claims

ABSTRACT OF THE DISCLOSURE

The present invention relates generally to reserve primary and secondary batteries and more particularly to improved reserve batteries which provide novel activation methods, gas venting and electrolyte flow control. Several different species of the invention are disclosed.

This is a continuation of application Ser. No. 257,643 filed May 30, 1972, now abandoned.

BACKGROUND OF THE INVENTION

This invention relates to batteries and more particularly to reserve primary and secondary batteries.

Reserve cell batteries are known in the art. They are batteries in which the electrodes are fully assembled for operation, but the electrolyte is held in reserve in a separate container until it is desired that the battery be activated. Since there is no consumption of the electrodes under these circumstances, the shelf life of these batteries is essentially unlimited. The battery is activated by transferring the electrolyte from its reserve/storage container to the battery electrode compartment.

Two major factors have important effects on the shelf life of reserve batteries. One is the possibility of the electrolyte leaking out of its reservoir and the other is loss of electrolyte through evaporation. This invention provides reserve batteries so designed that both of these problems are minimized.

SUMMARY OF THE INVENTION

Several different species of reserve primary and secondary batteries designed in accordance with this invention are shown and described. In all the species, however, the electrodes and the electrolyte are retained in separate containers or compartments until the battery is activated. The batteries are activated by activation means that permits the electrolyte to flow from the electrolyte comparment into the electrode compartment. Each of the disclosed batteries is provided with a particular activating system and some of the embodiments with particular gas venting and electrolyte flow control means. Further, all the disclosed batteries are so designed that the possibility of electrolyte leakage or evaporation is practically non-existent. Therefore, the shelf life of batteries designed in accordance with this invention is essentially unlimited.

DESCRIPTION OF THE DRAWING

A complete understanding of the invention can be obtained from the following detailed description of the invention when read in conjunction with the annexed drawing in which:

FIG. 1 is a cross sectional view of a rectangular type reserve battery constructed in accordance with this invention;

FIG. 2 is a cross sectional side view of FIG. 1;

FIG. 3 is a sectional view taken along the line C—C of FIG. 1;

FIG. 4 is a cross sectional view of a cylindrical reserve battery of this invention wherein the electrolyte container is detachable from the electrode container after the battery has been activated;

FIG. 5 is a section view taken along the line A—A of FIG. 4;

FIG. 6 is a section view taken along the line B—B of FIG. 4;

FIG. 7 is a cross sectional view of a cylindrical reserve cell embodiment of this invention in which the electrolyte container telescopes over the electrode container when the battery is activated;

FIG. 8 is a section view taken along the line A—A of FIG. 7;

FIG. 9 is a section view taken along the line B—B of FIG. 7;

FIG. 10 is a section view taken along the line C—C of FIG. 7;

FIG. 11 shows a latching device for holding the telescoping part of the battery of FIG. 7 in the compressed position after the battery has been activated;

FIG. 12 is a cross sectional view of a reserve battery constructed in accordance with this invention in which the battery is contained in the flexible plastic tube;

FIG. 13 is a cross sectional side view of FIG. 7;

FIG. 14 is a top view of the battery of FIG. 12;

FIG. 15 is a cross sectional view showing a modified version of the reserve battery of FIG. 7;

FIG. 16 is a section view taken along the line A—A of FIG. 15;

FIG. 17 is a section view taken along the line B—B of FIG. 15;

FIG. 18 is an end view of the battery of FIG. 15 showing the terminal and the battery;

FIG. 19 is another end view of the battery showing the electrolyte container and the battery;

FIG. 20 is a cross sectional view of another cylindrical reserve battery embodiment of this invention;

FIG. 21 is a top plan view of the battery of FIG. 20;

FIG. 22 is a cross sectional view of another embodiment of the reserve battery of this invention in which the electrodes are wound around a central electrolyte container;

FIG. 23 shows one of the electrodes of the battery of FIG. 22 before it is wound into a spiral and inserted into the case of the battery of FIG. 22; and FIG. 24 shows the other electrode of the battery of FIG. 22 before it is wound into a spiral and inserted into the battery case of FIG. 22.

DESCRIPTION OF THE INVENTION

Referring first to FIGS. 1, 2 and 3, these figures show a reserve battery arranged in a rectangular configuration. The case 10 which may be made from plastic or any other suitable material is divided into two major compartments, the electrode compartment 11 and the electrolyte compartment 12 which contains the electrolyte. Before the battery is activated, the electrolyte is constrained within electrolyte compartment 12 by means of the rubber piston 13 and the valve 14. Rubber piston 13 is prevented from being dislodged from electrode compartment 12 by means of the shoulders 20 which secure piston 13 in the position indicated in FIG. 1.

The electrodes 15 housed in electrode compartment 11 have the terminals 16 which extend through case 10 as shown in FIGS. 1 and 2. A baffle 18 is provided inside electrode compartment 11 in the position shown in FIG. 1. A gas vent hole 19 is provided in case 10 directly above baffle 18.

When the reserve battery shown in FIGS. 1, 2 and 3 is to be activated, rubber piston 13 is pushed upward in the direction indicated by the arrow 17 in FIG. 1. Rubber piston 13 can be pushed in the direction of arrow 17 by push rod or any other suitable means. A push rod (not shown) may be conveniently attached to battery case 10 by means of removable tape. The pressure created by pushing rubber piston 13 in the direction of arrow 17 is transmitted to valve 14 thereby forcing it open. When valve 14 is open, the electrolyte will flow into electrode compartment 11 through a small hole or channel provided in valve 14. This small hole or channel in valve 14, which provides for the transfer of the electrolyte from its storage compartment 12 to electrode compartment 11, serves as a hydrodynamic flow rate regulator. Thus, the electrolyte from compartment 12 can be introduced into electrode compartment 11 at a rate equal to the rate of electrolyte absorption by the electrodes.

Baffle 18 prevents the electrolyte from escaping outside container 10 through vent hole 19. Baffle 18 deflects the electrolyte stream issuing through the opening of valve 14 downward onto the electrodes 15. The amount of electrolyte provided in compartment 12 is just enough to saturate electrodes 15 and will be absorbed by the electrodes so that there is no fluid electrolyte remaining in electrode compartment 11 within a few minutes after piston 15 has emptied electrolyte compartment 12. A small wad of raw cotton (not shown) may be placed between baffle 18 and vent hole 19 to reduce the probability of electrolyte escaping from battery case 10.

After all the electrolyte has been transferred from compartment 12 to electrodes 15, the battery is fully activated and ready for use. Any gas generated during discharge of the battery escapes through vent hole 19. Without venting means such as vent hole 19, the gas pressure generated during discharge could build up in electrode compartment 11 to a point where the pressure inside compartment 11 is sufficiently great to bulge or crack battery case 10.

The electrode assembly contained in the electrode compartment 11 are not shown in detail since the electrode materials and electrode assembly configuration are not critical to the present invention. Such materials and configurations are well known in the art.

FIGS. 4, 5 and 6 show a cylindrical reserve battery embodiment of this invention. As shown in these figures, the battery comprises an electrode case or container 32 and an electrolyte container or case 37. Electrolyte container 37 may be made of plastic or any other suitable material. Electrode container 32 on the other hand must be made from a conductive material for reasons that will be apparent later.

Electrolyte container 37 has a compartment 22 which houses the electrolyte 25 and the piston 24. Electrolyte 25 may be contained in a thin glass or plastic envelope 28 as shown in FIGS. 4 and 6. A piston rod 23 which extends through case 37 is secured to piston 24. Case 37 is provided with a threaded male member 36. A hollow tube 26 extends through male member 36.

Electrically conductive case 32 has a compartment 21 which houses the electrodes 30. A valve arrangement comprising the spring 29 and the ball 27 are also housed in compartment 21. The top of case 35 is provided with a gas pressure release valve 35. A threaded member 38 is secured in compartment 21 and protrudes through case 32 as shown in FIG. 4. Member 38 has both internal and external threads. The internal threads are provided for receiving male member 36. A terminal nut 31 is threaded onto the external threads of member 38. Terminal nut 31 and member 38 constitute one terminal of the battery. Member 38 is insulated from metallic case 32 by means of the bushing 33. The case 32 constitutes the other terminal of the battery.

As long as electrolyte 25 remains enclosed in its envelope 28 the battery is inactive. The battery is activated by pushing piston rod 24 towards case 32. Before piston rod 23 can be so operated, the plastic cover 34 must first be removed. Cover 34 is provided to prevent accidental movement of piston rod 23 and therefore piston 24. Pushing piston rod 23 and therefore piston 24 toward case 32 fractures envelope 28 and forces electrolyte 25 under pressure through tube 26. Ball 27 is normally held in the position shown by spring 29. However, the pressure exerted on ball 27 by electrolyte 26 due to the movement of piston 24 unseats ball 27 thereby permitting entry of electrolyte 25 into electrode compartment 21. When all of the electrolyte has been transferred to electrode compartment 21 and the force on piston rod 23 has been removed, ball 27 will again reseat itself in the position shown in FIG. 4. Thus, spring 29 and ball 27 provide a uni-directional spring loaded ball valve which permits the introduction of fluid electrolyte into the electrode compartment but prevents flow in the opposite direction. Tube 26 is so sized as to provide control of the flow rate of electrolyte 25 into compartment 21.

When all of the electrolyte is transferred to electrode compartment 21, the battery is fully activated. At this point the force is removed from piston rod 24 and electrolyte container 37 serves no further useful purpose. As was mentioned above, male member 36 is threadedly secured to member 38. Therefore, when the battery is fully activated, electrolyte container 37 can be detached from case 32 and discarded by merely unscrewing member 36 from member 38. Of course, it is not necessary that electrolyte container 37 be detached from case 32 after the battery is activated. However, since electrolyte container 37 no longer serves any useful purpose it would in most cases probably be discarded.

FIGS. 7 thru 11 show a telescoping cylindrical embodiment of the reserve battery. As shown in these figures, the battery comprises a tubular case 40 having an electrolyte compartment 41 and an electrode compartment 42. Electrolyte compartment 41 houses the electrolyte 44 which may be encapsulated in a thin glass or plastic container 43. Electrode compartment 42 houses the electrodes 47.

Before the battery is activated, tubular cylinder 40 is extended to the volume indicated in FIG. 7 and the electrolyte is encapsulated in container 43 as shown in this figure. To activate the battery, telescoping case 40 is reduced to a minimum volume thereby shattering container 43 and forcing electrolyte 44 into electrode compartment 42. Electrolyte 44 flows into electrode compartment 42 through the tube 45. Before electrolyte 44 can enter electrode compartment 42, it must pass through the small holes or channel 46. These channels serve as a hydrodynamic flow rate regulator. Such regulation is desirable if, for example, electrode assembly 47 contains an absorbent material that is to be saturated with the electrolyte. In such a case the flow rate regulators 46 prevent too rapid introduction of electrolyte 44 into electrode compartment 42. The flow of electrolyte 44 is constricted to tube 45 by means of the "O" ring 51. A solid plastic tube 52 is inserted in hollow tube 45 to minimize the space for the accumulation of electrolyte outside the electrode compartment when case 40 is telescoped to its minimum volume.

As electrolyte 44 flows into electrode compartment 42 the air contained therein is forced through the small vent hole 48 into the compartment 49 and out to the atmosphere through the vent hole 50. Any gases that may be generated during discharge of the battery also flow through tube 48 into compartment 49 and, if sufficiently high gas pressures are involved, flow out into the atmosphere through vent hole 50. Compartment 49 may contain a material such as Porex, SLCA-5 Micron, manufactured by the Porex Materials Corporation of Fairburn, Ga.

One terminal of the battery is connected to the center metallic tube 45 through the bushing 56 to the center metallic button 57. The insulating bushings 54 and 55 separate this terminal of the battery from the other terminal which is connected through the screw 58 to the case 40, as indicated in FIG. 7.

FIG. 11 shows a latching arrangement that may be used to hold case 40 in the compressed position after the battery has been activated. As shown in this figure, the upper or telescoping portion of case 40 may contain a slot 53. The slot 53 is so designed that it will latch on screw 58 and hold in this position when the pressure applied in forcing electrolyte 44 into electrode compartment 42 is released. There will always be some pressure tending to force the telescoping section to expand. This force will latch the slot 53 on screw 58 to thereby hold the case 40 in the closed position. When the upper or telescoping section of case 40 is compressed it is merely turned until screw 58 engages slot 53.

FIGS. 12, 13 and 14 show a flexible case embodiment of the reserve battery. As shown in these figures, the battery comprises a flexible case 60 which houses the electrode 61 and the electrolyte 62. Electrolyte 62 is encased in a thin glass or plastic container 63. The electrodes 64 are brought out at one end of case 60.

This battery is activated by squeezing case 60 between the fingers. Squeezing case 60 will crush the container 63. Electrodes 61 will be saturated with electrolyte 62 from the crushed container and energy from the battery will be available at terminal 64 when electrodes 61 have absorbed the electrolyte.

To prevent accidental squeezing of flexible case 60, the battery may be housed in a stiff or rigid case from which it can be removed when needed. Such a rigid case is not shown in the figures.

FIGS. 15 thru 19 show a second telescoping reserve battery embodiment. As shown in these figures, the battery comprises a telescoping tubular case 70 which contains an electrolyte compartment 71 and an electrode compartment 72. Electrolyte compartment 71 contains a battery electrolyte 74 which may be encapsulated in a thin glass or plastic container 73. Electrode compartment 72 contains the electrodes 77. Before the battery is activated, case 70 is extended to the volume indicated in FIG. 15 and electrolyte 74 is encased in container 73 as also shown in FIG. 15. In other words, FIG. 15 shows the battery before activation. To activate the battery telescoping case 70 is reduced to a minimum volume thereby shattering electrolyte container 73 and forcing the electrolyte into the electrode compartment 72 through the tube 75. Electrolyte 74 enters electrode compartment 72 through the small channels or holes 76. These channels, as was the case with channels 46 of the battery shown in FIG. 7, serve as a hydrodynamic flow rate regulator. Regulation of the flow rate is desirable if, for example, the electrode assembly contains absorbent material that is to be saturated with the electrolyte. In such a case, the flow rate regulator 76 would be so sized that the rate at which electrolyte 74 flows into electrode compartment 72 is equal to the rate at which electrodes 77 can absorb the electrolyte. In order to constrict the flow of electrolyte 74 to tube 75 the "O" ring 81 is provided. A solid plastic tube 82 is inserted into hollow tube 75 to minimize the space for the accumulation of electrolyte 74 outside of electrode compartment 72 when telescoping case 70 is compressed to its minimum volume.

As electrolyte 74 flows into electrode compartment 72 the air contained therein is compressed into the area 79 of electrode compartment 72. This area 79 is sufficiently large so that the pressure within electrode compartment 72 rises only slightly. However, should this pressure be excessive or if the pressure increases due to any gas generated during discharge of the battery, a valve 89 is provided to relieve this pressure.

One terminal of the battery is connected to the center metallic button 87. The insulating bushings 84 and 85 separate this terminal of the battery from the other terminal which is connected through the screw 88 to the case 70 as indicated in FIG. 15.

The latching arrangement shown in FIG. 11, designed to hold the battery case in the compressed position after activation, may be used with this battery and operates as described above.

From the foregoing description and the description of the battery shown in FIGS. 7 thru 11, it is obvious that the battery shown in FIGS. 15 thru 19 and the battery shown in FIGS. 7 thru 11 are similar. The basic difference between these two batteries being the manner in which gas venting is provided and the manner in which the air pressure caused by activating the battery is handled.

FIGS. 20 and 21 show another cylindrical reserve battery embodiment of this invention. As shown in these figures, the battery comprises a cylindrical case 91 which contains the electrolyte and the electrodes. As was the case with the other embodiments, FIGS. 20 and 21 show the battery prior to activation. The electrolyte 93 is contained in a plastic tube 99 which is enclosed at one end by the plastic cover 98 and at the other end by the rubber piston 92.

The electrodes which are housed in the electrode compartment 100 are fabricated in the form of concentric tubes that surround electrolyte tube 99. While other concentric tube arrangements could be used, the center tube 94 that directly surrounds tube 99 may be made of stainless steel and connected directly to the center button 90 at the top of the battery. This connection forms one terminal of the battery. Terminal 90 is insulated from case 91 by means of the plastic disc 101. The next concentric tube 95 could be a depolarizing mix for the battery and the next tube 96 could be the separator. Finally, the outside concentric tube 97 could be the active material of the battery. In such a case metallic case 91 surrounding the concentric cylinders would be in contact with active material 97 to form the other terminal of the battery.

To activate the battery shown in FIGS. 20 and 21, rubber piston 92 is pushed toward terminal 90 with a suitable rod or other device. Plastic cover 98 is so designed that it will give way when piston 92 is pushed toward terminal 90. When plastic cover 98 gives way electrolyte 93 can flow into electrode compartment 100. Rubber piston 92 is pushed toward terminal 90 until all of the electrolyte 93 is in electrode compartment 100. As the battery discharges any gases generated will push rubber piston 92 back toward its original position, thereby relieving the pressure in electrode compartment 100.

FIGS. 22 thru 24 show a modification of the battery shown in FIGS. 20 and 21. In this battery the electrolyte 112 is constrained within the coaxial tube by the rubber piston 105 and the plastic cover 107 until the battery is ready for use. The electrode package which is indicated schematically in FIG. 22 is actually a spiral package such as shown in the battery of FIGS. 20 and 21. However, in this case, the electrode package 104 is made up of two spiral-wound electrodes separated by a suitable separator (not shown). The electrodes are shown prior to winding in FIGS. 23 and 24. As shown in these figures, electrode 108 has the electrical connection 102 welded in place and electrode 109 has the electrical connection 106 welded in place. To form the electrode package 104, a separator (not shown) is placed on top of one of the electrodes 108 or 109 and the other electrode is then placed on top of this separator. The electrodes are then wound in a spiral to form the electrode package 104. This package is, of course, slipped over the electrolyte tube in the manner shown for the battery of FIGS. 20 and 21. Electrical connector 102 is connected to terminal button 110 and electrical connector 106 is connected to the battery case 103, as shown in FIG. 22. Terminal 110 is insulated from battery case 103 by means of the insulating disc 111.

To energize this battery, one merely pushes rubber piston 105 toward terminal 110 with a push rod or any other suitable means. When piston 105 is pushed toward terminal 110, the cover 107 is separated from the electrolyte tube and electrolyte 112 can then flow into the electrode compartment, thereby activating the battery and making it ready for use. Any gas generated during discharge of the battery will push rubber piston 105 back toward the position shown in FIG. 22 to thereby relieve the pressure within the electrode compartment.

While the invention has been shown and described with reference to specific embodiments, it will be be obvious

What is claimed is:

1. A reserve battery that remains in an inactive state until activated comprising:
   (a) a battery case having an electrode compartment;
   (b) battery electrodes housed in said electrode compartment;
   (c) an electrolyte container;
   (d) an electrolyte stored in said electrolyte container;
   (e) means to attach said electrolyte container to said battery case;
   (f) means to isolate said electrolyte from said electrodes when said electrolyte container is attached to said battery case to keep said reserve battery in said inactive state until activated;
   (g) a first battery terminal formed by said battery case;
   (h) a second battery terminal comprising a hollow member passing through one end of said battery case;
   (i) means to insulate said hollow member from said battery case;
   (j) a gas vent valve located in said battery case; and
   (k) means for transferring said electrolyte, under pressure, from said electrolyte container to said electrode compartment when said electrolyte container is attached to said battery case to thereby activate said battery, said electrolyte is stored in a frangible envelope inside said electrolyte container and wherein said means to attach said electrolyte container to said battery case includes means for removably attaching said electrolyte container to said battery case, said means for removably attaching said battery case comprises a hollow channel member extending from one end of said electrolyte container, said hollow channel member having a hollow tube passing therethrough and being so designed that said hollow channel member can be removably secured inside said hollow member of said battery case, said hollow tube extending into said battery case when said hollow channel member of said electrolyte container is secured inside said hollow member of said battery case.

2. A reserve battery as defined in claim 1 wherein said means to isolate said electrolyte from said electrodes comprises a spring and ball valve so positioned inside said battery case that said ball under the influence of said spring closes on the end of said hollow tube that extends into said battery case when said electrolyte container is secured to said battery case.

3. A reserve battery as defined in claim 2 wherein said means to transfer said electrolyte from said electrolyte compartment to said electrode compartment comprises a movable piston located in said electrolyte container in such a position that said frangible envelope is positioned between said piston and said hollow tube, said piston having a piston rod extending through said electrolyte case so that said piston can be moved by means of said piston rod toward said hollow member to thereby fracture said frangible envelope and force said electrolyte through said hollow tube past said ball into said battery case to thereby activate said battery.

4. A reserve battery that remains in an inactive state until activated, comprising:
   (a) a battery case having a first hollow cylinder and a second hollow cylinder telescopically mounted over said first hollow cylinder, said first hollow cylinder defining an electrode compartment and the upper portion of said second hollow cylinder defining an electrolyte compartment;
   (b) first and second battery terminals;
   (c) battery electrodes housed in said electrode compartment defined by said first hollow cylinders;
   (d) an electrolyte housed in said electrolyte compartment defined by said second hollow cylinder;
   (e) means to isolate said electrolyte from said electrodes to keep said reserve battery in said inactive state until activated;
   (f) a hollow tube axially positioned in said electrode compartment, said hollow tube being open at one end and having a pair of small channel openings at its other end and being so axially positioned in said electrode compartment that said open end is adjacent said electrolyte compartment and communicates therewith; and
   (g) means for transferring, under pressure, said electrolyte from said electrolyte compartment to said electrode compartment to thereby activate said battery.

5. A reserve battery as defined in claim 4 wherein said first terminal is said battery case; said second terminal comprises a conductive member extending through the end of said first cylinder that is opposite the end of said first cylinder over which said second cylinder is telescopically mounted; and wherein said hollow tube houses a solid cylindrical member having a diameter slightly smaller than the diameter of said tube throughout its entire length except for the end adjacent said small channels where the end of said solid cylindrical member has a diameter considerably smaller than the diameter of said hollow tube.

6. A reserve battery as defined in claim 5 wherein said means to isolate said electrolyte from said electrodes comprises a frangible envelope which contains said electrolyte and is housed in said electrolyte compartment.

7. The reserve battery as defined in claim 6 wherein said means for transferring under pressure said electrolyte from said electrolyte compartment to said electrode compartment is said telescopically mounted second cylinder, said second cylinder being telescopically closed on said first cylinder to thereby rupture said frangible envelope to permit said electrolyte to flow through said hollow tube and out said small channels into said electrode compartment to thereby activate said battery.

8. A reserve battery as defined in claim 7 wherein a screw protrudes through said first cylinder into said electrode compartment and said second cylinder has a notch cut therein, said notch engaging said screw when said second cylinder is telescopically closed on said first cylinder to thereby hold said second cylinder closed on said first cylinder.

9. A reserve battery as defined in claim 8 wherein a ring seal is located between said electrode compartment and said electrolyte compartment to restrict the flow of said electrolyte to said hollow tube when said frangible envelope is fractured.

10. A reserve battery as defined in claim 9 wherein a gas relief pressure chamber having a small channel communicating with said electrode compartment is located between said electrode compartment and said electrolyte compartment and wherein a gas vent to vent gas pressure to the atmosphere is connected to said gas relief pressure chamber.

11. The reserve battery as defined in claim 9 wherein said second cylinder is provided with a gas pressure relief valve.

12. A reserve battery that remains in an inactive state until activated comprising:
   (a) a substantially rectangular battery case having an electrode compartment and an electrolyte compartment;
   (b) a wall structure located inside said battery case and extending the full length of said battery case to isolate said electrode compartment from said electrolyte compartment;
   (c) first and second battery terminals;
   (d) battery electrodes housed in said electrode compartment;
   (e) an electrolyte housed in said electrolyte compartment;

(f) a small channel cut through said wall structure near one end thereof and therefore adjacent one end of said battery case;

(g) a pressure responsive valve affixed to said wall structure and covering said channel on the electrode compartment side of said wall structure;

(h) an opening formed in the end of said battery case opposite said one end of said battery case adjacent said small channel, said opening passing through said battery case into said electrolyte compartment;

(i) a manually operable piston housed in said electrolyte compartment, one end of said piston being seated over said opening in said battery case when said battery is in said inactive state, said piston being so shaped as to form a seal to prevent the escape of said electrolyte through said opening in said battery case but also being so shaped that said piston can be moved toward the said one end of said battery case adjacent said small channel while maintaining said seal, said piston being manually moved through said opening toward said one end of said battery case to apply pressure on said electrolyte thereby opening said pressure responsive valve and transferring said electrolyte from said electrolyte compartment to said electrode compartment through said small channel to activate said battery;

(j) a gas vent passing through said battery case into said electrode compartment, said gas vent passing through said battery case adjacent said one end of said battery case adjacent said small channel; and (k) a baffle attached in said electrode compartment in such a manner as to partially cover said gas vent to prevent the discharge of said electrolyte through said gas vent as said electrolyte is being transferred under pressure by means of said piston from said electrolyte compartment to said electrode compartment.

13. A reserve battery that remains inactive until activated, comprising:

(a) a hollow cylindrical battery case having a concentric circular opening in one end thereof;

(b) a hollow cylinder concentrically located inside said battery case, said hollow cylinder being open at both ends and having an outside diameter slightly larger than said circular openings, one end of said hollow cylinder being attached to the inside of said battery case at the end of said battery case having said circular opening with the other end of said hollow cylinder extending toward the end of said battery case opposite said end having the circular opening but said hollow cylinder being shorter in length than said battery case so that an open space exists inside said battery case between said other end of said hollow cylinder and said end of said battery case opposite said end of said battery case having said circular opening;

(c) an electrode package slipped over said hollow cylinder such that said electrode package occupies the space inside said battery case between said hollow cylinder and the inside wall structure of said battery case, (d) a first battery terminal secured to and extending beyond the end of said battery case opposite said end of said battery case having said circular opening, said first battery terminal being insulated from said battery case;

(e) a second battery terminal formed by said battery case;

(f) an electrolyte housed inside said hollow cylinder;

(g) a movable piston located inside said hollow cylinder adjacent said end of said battery case having said circular opening when said battery is in said inactive state, said piston being so shaped that it provides a seal to prevent the escape of said electrolyte through said circular opening, but also being so shaped that it can be manually moved toward said other end of said hollow cylinder while maintaining said seal to thereby apply pressure on said electrolyte; and (h) a cap removable under presure covering said other end of said hollow cylinder, said cap covering said other end of said hollow cylinder to retain said electrolyte in said hollow cylinder to maintain said battery in said inactive state until said battery is activated, said battery being activated by moving said piston toward said other end of said hollow cylinder, the moving of said piston toward said other end of said hollow cylinder causing the application of a pressure on said electrolyte to thereby remove said cap and force said electrolyte out of said hollow cylinder into the area of said battery case occupied by said said electrode package to thereby activate said battery.

14. A reserve battery as defined in claim 13 wherein said electrode package comprises concentric cylindrical electrodes.

15. A reserve battery as defined in claim 13 wherein said electrode package comprises spirally wound electrodes.

References Cited

UNITED STATES PATENTS

| | | | |
|---|---|---|---|
| 2,810,776 | 10/1957 | Brill et al. | 136—162 |
| 2,850,556 | 9/1958 | Hermitte | 136—91 |
| 2,862,038 | 11/1958 | Blaru | 136—90 |
| 3,481,791 | 12/1969 | Orsino | 136—113 |
| 3,222,225 | 12/1965 | Amiet et al. | 136—90 |
| 3,484,297 | 12/1969 | Zaleski | 136—114 |
| 3,516,869 | 6/1970 | Broglio | 136—114 |
| 3,536,536 | 10/1970 | Lucas | 136—114 |
| 3,575,726 | 4/1971 | Marsault | 136—114 |
| 3,663,302 | 5/1972 | Kaye | 136—114 |
| 3,669,753 | 6/1972 | Kaye | 136—114 |

ANTHONY SKAPARS, Primary Examiner

U.S. Cl. X.R.

136—90